Figure 1:
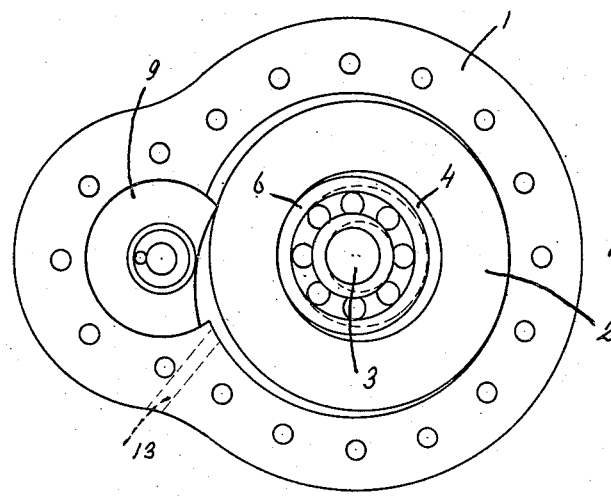

May 27, 1930.  C. A. HULT  1,760,699
ROTARY COMPRESSOR, PUMP, OR MOTOR

Filed March 29, 1928

Patented May 27, 1930

1,760,699

UNITED STATES PATENT OFFICE

CARL ALRIK HULT, OF STOCKHOLM, SWEDEN

ROTARY COMPRESSOR, PUMP, OR MOTOR

Application filed March 29, 1928, Serial No. 265,730, and in Sweden April 6, 1927.

This invention refers to improvements in such rotary compressors, pumps or motors as have a stationary cylindrical casing and a cylindrical roller, excentrically mounted and journalled therein, whereby a crescent-shaped working chamber is constituted, which is divided by a blade or the like sliding in the casing.

One of the drawbacks with this kind of rotary engines during high speeds is, that a very hard knock is caused every time the roller runs over the sliding blade. As a certain pressure must prevail between the roller and the circular wall and between the sliding blade and the roller in order to keep the working chamber tight, the end of the sliding blade will in time be somewhat worn and disfigured and this will, during a high rotary speed, cause the same effect as when a railroad-car runs over a rail-joint.

Another drawback with this kind of rotary engines is the reciprocating movements of the sliding blade at every turn of the shaft. With exceptionally high speeds of 6,000 revolutions or more a minute, the inertia of the sliding blade will cause considerable vibrations and the spring which keeps the blade pressed against the roller, will soon be so exhausted that it breaks down.

Another drawback with this kind of rotary engines is that the pressure between the roller and the cylinder wall must be effected either by the tension of the shaft being so high that it dominates the gas- or liquid pressure on the surface of the cylindrical roller during operation, or by applying tightening sliding blades on the circumference of the roller.

The object of my invention is to eliminate these drawbacks, whereby it is possible to make a nearly perfectly balanced compressor, pump or motor, rotating at speeds of 6,000 revolutions or more a minute and thereby to attain a great capacity with a very small machine.

In order to avoid the knocks when the roller runs over the sliding blade, the cylindrical roller has been provided with inside cylindrical tracks, which roll against cylindrical shoulders or bearings which may also consist of the outer rings of the roller or ball bearings which support the shaft. The bearings are placed concentrically to the outer cylindrical casing and are less in their outside diameters than the inner tracks of the roller, by the amount equalling the difference in diameters between the outside diameter of the rotor and the inside diameter of the cylinder.

By these means, the outward movements of the cylindrical roller towards the cylindrical casing are perfectly determined and guided, so that when the roller passes the point of the uneven surface of the sliding-blade, all knocks are avoided and prevented.

In order to eliminate the vibrations caused by the sliding-blade running back and forward in its aperture of the casing and to prevent the exhaustion of the spring during exceedingly high speeds of the roller and shaft, the sliding blade is substituted by a revolving cam-slide, supported in the casing in such a way, that one edge of the cam-slide is so pressed against the roller by a spring that while during the rotation of the roller the one edge of the cam-slide turns inwards, the other edge turns in the opposite direction. The cam-slide is hollow and in this aperture a spiral spring is inserted, which is fixed to the cam-slide with one end and with the other end is fixed to the side cover of the casing.

During the small turning of the cam-slide, very small changes in the tension of the spring are caused, whereby it will stand good even during a very high speed of the shaft. In order to get a gas-tight rolling contact between the roller and the cylindrical wall, without special arrangements of sliding blades or the like fitted to the roller, or by the pressure and tension of the shaft, the roller is so arranged as to its weight, excentricity and rotary speed, that the pressure of the centrifugal force acting on same during the rotation of the shaft, is higher than the pressure from the fluid in the working chamber, acting in the opposite direction. But as this contrivance alone would cause the machine to get out of balance, two counterweights are mounted on the shaft, one on each side of the roller. As the centrifugal force acts at the same time on the roller and on the counterweights at different points lengthwise apart from one another the centrifugal force acting on the roller is not prevented from causing a tight rolling contact by the centrifugal force acting on the counterweights. It is only presumed that the shaft, on which the roller and counterweights are supported, is somewhat flexible.

Figure 2:
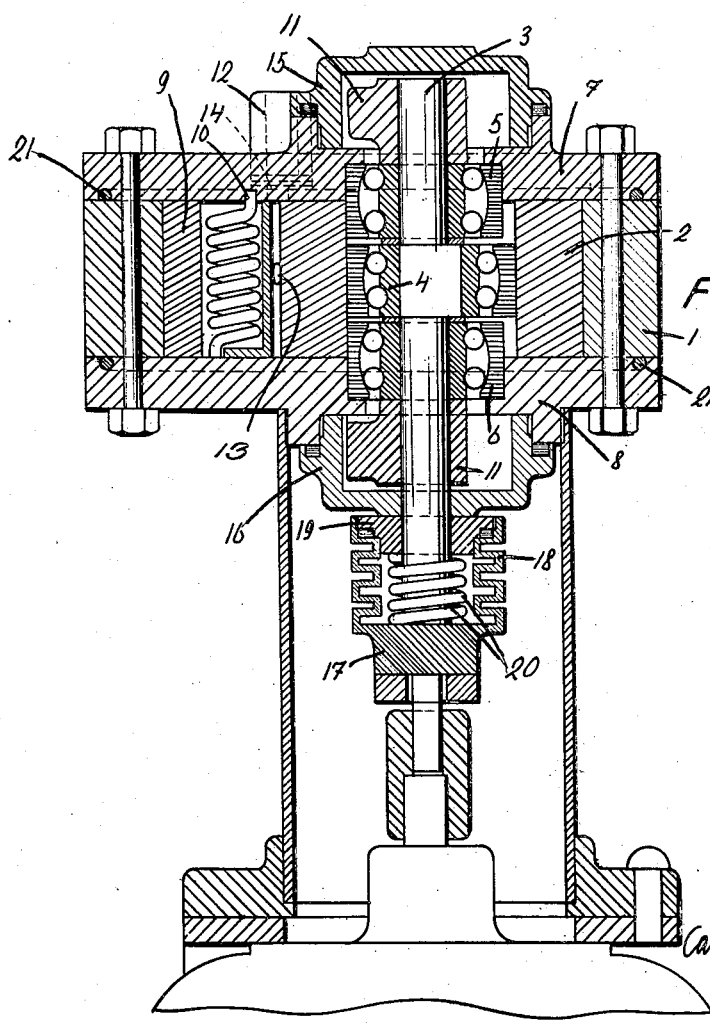

These and further objects and novelties of the invention are hereinafter more fully described and shown in the accompanying drawing in which Figure 1 is a side-elevation of a rotary pump, compressor or motor according to my invention on which the side-cover is taken away. Figure 2 is a vertical sectional view of the pump or compressor. The same characters refer to the same parts throughout the drawing and specification.

In the cylindrical casing 1 a roller 2 is excentrically mounted on a shaft 3. The roller is mounted or journalled on the shaft by means of a roller- or ball-bearing 4, while the shaft preferably is journalled on the ball- or roller-bearings 5 and 6 which are supported and mounted in recesses in the side-covers 7 and 8. In the casing a hollow rotatable cam-slide 9 is mounted or journalled, in which a spiral spring 10 is inserted and serving to press the one edge of the slide against the roller 2. In the shaft 3 the counterweights 11 are mounted. To the working-chamber lead the canals 12 and 13 which conduct the fluid to and from without. One of these canals is provided with a valve 14. The side-covers 7 and 8 are provided with small end covers 15 and 16, which tightly enclose the counterweights 11. In order to prevent gas or liquid from escaping or leaking out between the shaft 3 and the cover 16 the shaft 3 is provided with a flange 17, tightened with a nut, the said flange being formed out to a multiple diaphragm 18, which is tightly connected to another flange 19 pressed against the end surface of the cover 16 by means of a spiral spring 20 or by its own tension. To prevent leakage of gas or liquid from the working-chamber between the outer casing and the side covers grooves 21 are provided in the side covers, in which packings of suitable material are inserted.

The rotation of the shaft 3 will also cause the roller 2 to revolve around its axis but the latter will revolve at a very small speed compared to the former. The relation of speeds is determined by the difference in the diameter of the inside of the cylindrical casing and that of the roller.

As the speed of the rotary engine, by the almost perfect balance of all its moving elements and by the relatively slow speed of the roller 2, can be brought up to the same speed as a separator bowl, it is possible to gain a relatively great capacity by a very small machine.

If, for instance, the engine is used as a compressor of a refrigerator, it may be coupled directly to a vertically journalled electric motor or generator with great speed, whereby a gain is made in foundation space and the condensation pipes may be placed around the machine and the electric motor, even otherwise.

Having now described my invention, what I claim as new and desire to secure by Letters Patent is:

1. In a rotary pump, compressor or engine of the type set forth, a casing having covers, a rotor in the casing and having a central bore, a rotor shaft journalled in two bearings mounted in the covers and one on each side of the rotor, said bearings extending into the central bore of the rotor and having an outside diameter so proportioned to the diameter of said bore that the difference in diameters is equal to the difference in diameters between the outside diameter of the rotor and that of the bore of the rotor casing, so that the surface of the inner bore of the rotor will contact with the surface of the bearings while the outer surface of the rotor will run closely against the internal surface of the casing.

2. In a rotary engine or the like according to claim 1, means for journalling the rotor at such a degree of eccentricity with respect to the axis of the shaft that its weight at the high speed of rotation for which the motor is adapted will create a centrifugal force urging the rotor towards the wall of the cylinder, whereby the pressure between the contacting surfaces will be greater than the pressure from the fluid in the working chamber in the opposite direction.

3. In a rotary engine according to claim 1, an oscillating hollow camslide turnably mounted in the casing and extending into the working chamber with one of its edges and a spiral spring actuating the camslide and inserted on its inside and fixed at one end to the casing and at the other end to the camslide.

In witness whereof, I have hereunto signed my name.

CARL ALRIK HULT.